United States Patent [19]

Hamilton et al.

[11] 4,220,881

[45] Sep. 2, 1980

[54] DUAL, THREE PHASE, INVERTER-DRIVEN MOTOR

[75] Inventors: David C. Hamilton, Ridgewood; Joseph W. Fleming, Ramsey, both of N.J.

[73] Assignee: Ramsey Controls, Inc., Mahwah, N.J.

[21] Appl. No.: 900,824

[22] Filed: Apr. 28, 1978

[51] Int. Cl.³ .............................................. H02K 3/00
[52] U.S. Cl. ................................... 310/184; 310/194
[58] Field of Search ............... 310/112, 179, 180, 184, 310/198–208; 318/803, 807, 810, 811, 813; 322/63, 64, 66

[56] References Cited

U.S. PATENT DOCUMENTS

| 2,630,541 | 3/1953 | McElligott | 310/198 |
|---|---|---|---|
| 3,152,273 | 10/1964 | Harrington | 310/198 |
| 3,348,109 | 10/1967 | Wright | 318/807 |
| 3,430,126 | 2/1969 | Richardson | 310/198 |
| 3,476,964 | 11/1969 | Willyoung | 310/198 |
| 3,515,922 | 6/1970 | Fong | 310/198 |
| 3,601,642 | 8/1971 | Willyoung | 310/198 |
| 3,611,085 | 10/1971 | Rosenberry | 318/813 |
| 3,652,880 | 3/1972 | Harrington | 310/198 |
| 3,660,705 | 5/1972 | Willyoung | 310/205 |
| 3,728,567 | 4/1973 | Picmaus | 310/112 |

Primary Examiner—R. Skudy

Attorney, Agent, or Firm—Mel K. Silverman; Mahendra A. Gandhi

[57] ABSTRACT

The present invention discloses a stator assembly for a dual three phase inverter-driven motor. The stator assembly includes: a radially disposed matrix of phase belts each having several pole groups, such phase belts being disposed at fixed radii from the axis of the rotor of the motor, each of the pole groups therein comprising twelve stator slots; a first plurality of three phase motor windings, each of such windings having a span length of either stator slots within its respective pole group, each pole group winding of said first plurality of motor windings having two coils per pole group, the first of such coils of each pole group being wound upon the i and i+8 stator slots, and the second coil of each pole group being wound upon the i+1 and i+9 stator slots; and a second plurality of three phase motor windings, each of such windings having a span length of eight stator slots, each pole group winding of said second plurality of motor windings having two coils per pole group, the first coil of each pole group being would upon the i+2 and i+10 stator slots, and the second coil of each pole group being wound upon the i+3 and i+11 stator slots, said two pluralities of motor windings thereby being symmetrically disposed about opposite ends of each phase belt pole group so as to leave the central four slots of each phase belt pole group free of any windings.

8 Claims, 5 Drawing Figures

DUAL, THREE PHASE, INVERTER-DRIVEN MOTOR

BACKGROUND OF THE INVENTION

The present invention relates to inverter-driven motors and, more particularly, to motors of the type employed in the practice of U.S. Pat. No. 3,611,085 (1971) to Rosenberry.

Rosenberry teaches a polyphase system comprising a motor having a plurality of electrically separate polyphase motor windings, each of such windings being physically disposed at an angle with respect to each other such windings within said motor. In electrical connection with said motor is a plurality of inverters, each of the inverters supplying polyphase power directly to a different one of said polyphase windings, the output of each of said inverters being phase shifted with respect to the output of said other inverters by an amount equivalent to the angular displacement between the respective motor windings.

In the prior art, separate polyphase motor windings have been wound upon pole groups in which each pole group comprised twelve stator slots. Thereupon, winding was accomplished in a fashion such that each winding occupied a span of nine stator slots within its respective pole group. Thusly, nine-twelfths of each pole group was occupied by a winding of the type employed in the prior art in the practice of Rosenberry. A winding of this nature was, based upon the nine-twelfths figure, termed a 0.75 winding pitch.

In the course of experimenting with the 0.75 pitch inverter-driven motors, it had been found that certain undesirable harmonics were present. Also, certain difficulties in the testing of a 0.75 wound polyphase motors had existed.

In an effort to overcome these difficulties, it has been discovered that a winding pitch of 0.67 will provide a reduction in harmonics and will lend itself to ease of testing.

Additionally, the 0.67 winding pitch has been found to provide a beneficial reduction in leakage reactance, all to the improved performance of the motor.

The prior art in the present area has exhibited a large variety of stator configurations, including many techniques for the winding thereof. A representative example of this prior art includes the following:

U.S. Pat. No. 2,414,571 (1947) to Veinott, entitled Polyphase Armature Winding.

U.S. Pat. No. 2,637,541 (1953) to McElligott, entitled Dynamo Electric Machine Winding Arrangement.

U.S. Pat. No. 3,152,273 (1964) to Harrington, entitled Polyphase Generator Windings Provided with Three Parallel Connected Circuits per Phase.

U.S. Pat. No. 3,408,517 (1968) to Willyoung, entitled Multiple Circuit Winding Patterns for Polyphase Dynamo Electric Machines.

U.S. Pat. No. 3,476,964 (1969) to Willyoung, entitled Multiple Circuit Armature Winding for Polyphase Dynamo Electric Machine.

U.S. Pat. No. 3,601,642 (1971) to Willyoung, entitled Multi-Three Phase Winding With Interchanged Circuit Sequence.

U.S. Pat. No. 3,652,888 (1972) to Harrington, entitled Two Pole, Forty-Five Slot, Three Circuit Dynamo Electric Machine Winding Pattern.

SUMMARY OF THE INVENTION

The present invention comprises a stator assembly for a dual three phase inverter-driven motor, said stator assembly comprising: (a) a radially disposed matrix of phase belts each having several pole groups, said phase belts being at fixed radii about the axis of the rotor of the motor, each of said pole groups therein comprising twelve stator slots; (b) a first plurality of three phase motor windings, each of said windings having a span length of eight stator slots within its respective pole group, each pole group winding of said first plurality of motor windings having two coils per pole group, the first of said coils of each pole group being wound upon a given stator slot i and i+8 stator slots, and the second coil of each pole group being wound upon the i+1 and i+9 stator slots; and (c) a second plurality of three phase motor windings, each of said windings having a span length of eight stator slots, each pole group winding of said second plurality of motor windings having two coils per pole group, the first coil of each pole group being wound upon the i+2 and i+10 stator slots, and the second coil of each of said group being wound upon the i+3 and i+11 stator slots, said two pluralities of motor windings thereby being symmetrically disposed at opposite ends of each phase belt pole group, thereby leaving the central four slots of each phase belt pole group free of any windings.

It is an object of the present invention to provide a stator assembly for use in a polyphase motor system, which stator assembly will exhibit improved characteristics of reduced harmonic distortion.

It is a further object of the present invention to provide a stator assembly which will provide ease of testing with reference to prior art stator assemblies used in polyphase motor systems.

It is a still further object to provide an assembly of the above-described type which will provide relative economy in its cost of construction.

It is a yet further object to provide an assembly of the type above-described which will exhibit improved characteristics of leakage reactance and stator resistance, thereby enhancing overall performance of the polyphase motor system.

DETAILED DESCRIPTION OF THE INVENTION

Figure 1:
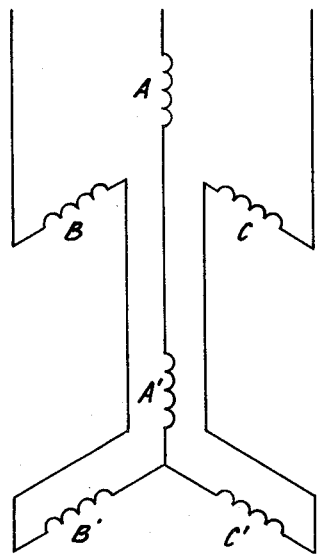
FIG. 1 is a schematic illustration of a Y—Y connection between the respective two pluralities of motor windings.

With regard to FIG. 1, there is schematically illustrated the Y—Y connection which exists between the three phase output of a prior art inverter system and the field excitation windings of the polyphase motor of the present invention. It is to be appreciated that the present invention is not limited to Y—Y connections but rather, in the present embodiment, the Y—Y connection has been found to lend itself to ease of construction as well as ease of testing.

Figure 2:
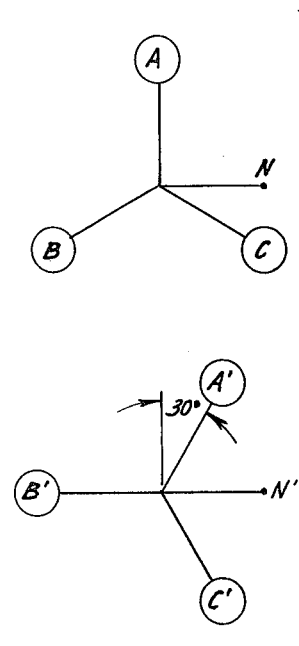
FIG. 2 comprises two schematic illustrations showing the phase differential between the current passing through the two motor windings of the present dual motor assembly.

With respect to FIG. 2, there is illustrated the angular offset of the respective phase groups which is exhibited in the present embodiment of the invention. More particularly, it is noted that a 30 degree offset between the respective phase groups of each of the two integral motors in the composite motor system is provided. The usage of the 30 degree offset is a product of the 60/n formula, in which n equals the number of integral motor subsystems within a multiple motor winding; this formula was first expressed by Rosenberry in U.S. Pat. No. 3,611,085, as discussed above in the Background of the Invention. Inasmuch as the preferred embodiment of the present invention comprises a dual, that is, two-in-one, motor system, the n in the above formula is equal to two, thereby indicating a preferred offset of 30 degrees.

Figure 3:
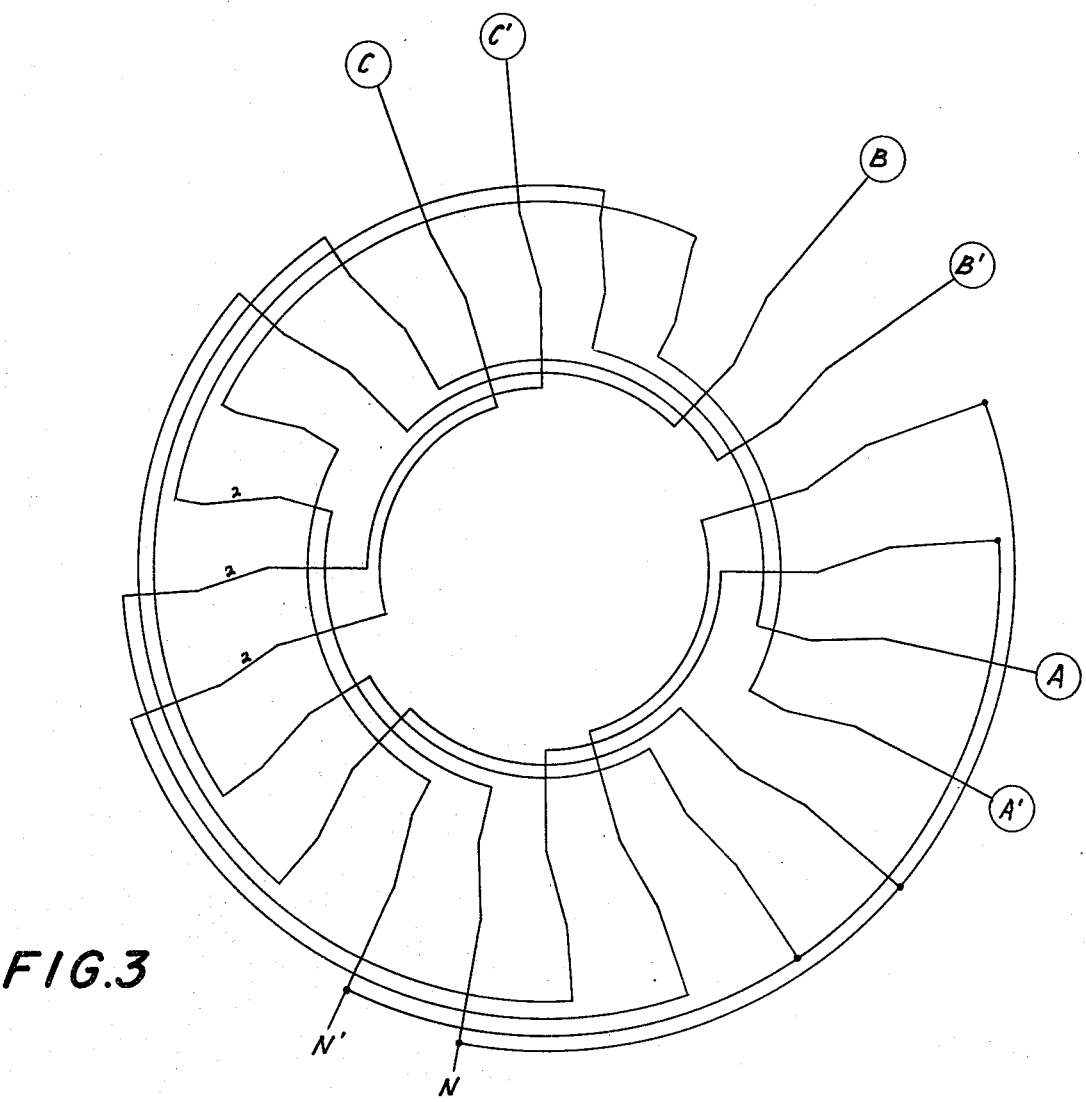
FIG. 3 is a polar wiring diagram showing the relationship between the phase groups in the present dual motor.

With respect to FIG. 3, a schematic polar view of the phase group interconnections for each of the three phases for each of the two integrally wound motors, is presented. In this diagram, it is to be noted that the preferred embodiment comprises the use of four pole groups for each of the two integrally wound motors. Within each pole group there is, as denoted in FIG. 3 by the numeral "2", two coils wound per pole group.

Further, the preferred embodiment consists of 24 pole groups. Also, as is more specifically shown in FIGS. 4 and 5, four pole groups for each of the three phase groups are provided.

Figure 4:
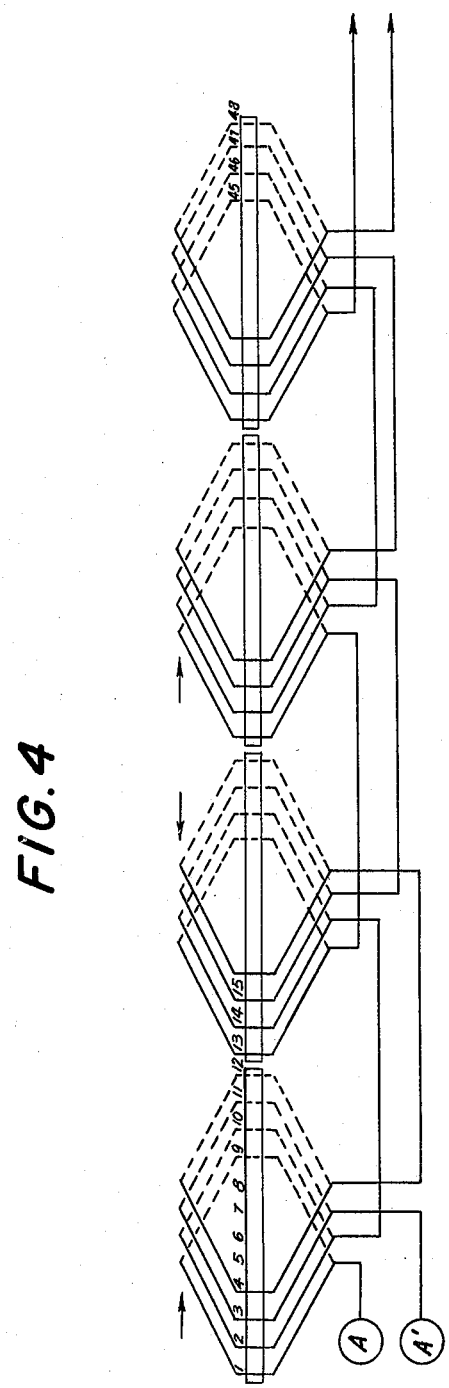
FIG. 4 is a schematic illustration of a single phase belt of the present dual motor.
Figure 5:
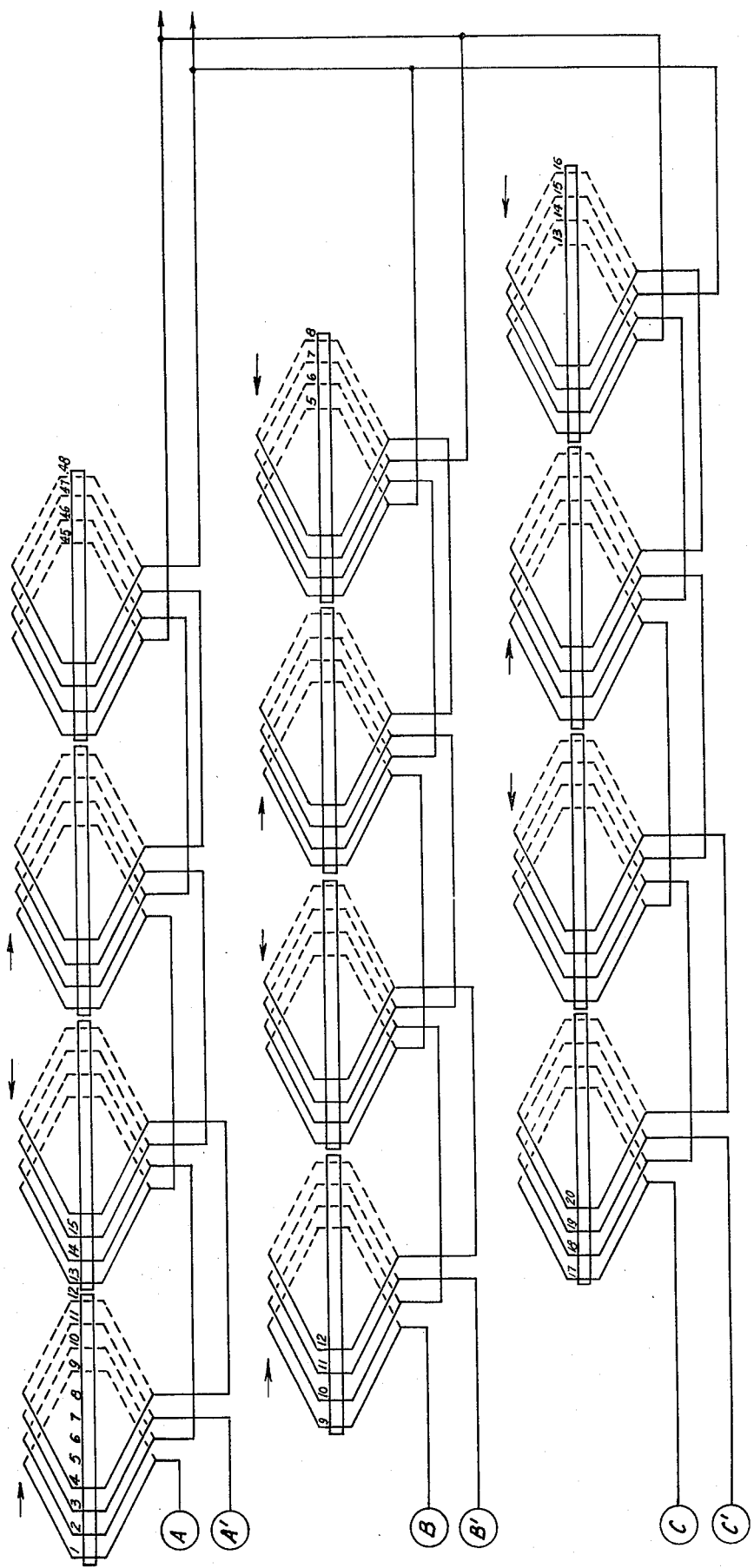
FIG. 5 is a schematic illustration of the winding configurations of each phase belt and its respective pole groups.

With reference to FIG. 4, it is to be appreciated that the matrix of phase belts illustrated therein is radially disposed within the stator at fixed radii about the axis of the rotor. Further, it is noted that each phase belt comprises four pole groups, each having twelve stator slots. Further, in each pole group are two windings for each of the two respective motor windings. More particularly, in the pole group illustrated at the left of FIG. 4, windings for the first motor appear in slots 1 and 9, and slots 2 and 10; while windings for the second motor appear in slots 3 and 11, and slots 4 and 12. As may be noted in FIG. 5 showing the pole groups for phase belts B and C, the first winding in any particular pole group must start at the first slot of the respective pole group. However, phase belt B will begin at slot 9, while phase belt C will begin at slot 17, thereby providing the trilateral radial symmetry about the stator, i.e., 120 degree angular displacement, that is required in a three-phase motor.

The result of the above winding pattern is to produce a first and second plurality of motor windings in which windings for the respective sub-motors occupy four slots at the beginning and end of each phase belt pole group, thereby leaving the central four slots of each phase belt pole group free of any windings.

It is noted that the angular distance between each of the stator slots corresponds to 7.5 degrees of physical circumference of the stator assembly. Also, the "two slot" winding separation between the respective pluralities of motor windings corresponds to the above-mentioned 30 degree per pole winding offset between the respective polyphase motor winding groups.

The above winding technique is termed a 0.67 pole pitch based upon the fact that eight-twelfths of each pole group core is occupied by windings.

As has been above noted in the Background of the Invention, the prior art in the present area has utilized a 0.75 pole pitch.

As may be noted upon observation of the physical configuration of the present winding invention, the smaller (0.67 pitch) loops of each winding tend to reduce leakage reactance.

While there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

Having thus described our invention what we claim as new, useful and non-obvious and accordingly secure by Letters Patent of the United States is:

1. A stator assembly for use in a dual, single phase motor system, said stator assembly comprising:
   (a) a matrix of phase belts radially disposed at a fixed radius about the axis of the rotor, each of said phase belt comprising a plurality of pole groups, each having twelve stator slots;
   (b) a plurality of first motor windings, said motor windings having a span lengths of eight stator slots within each respective pole group, each winding of each pole group having two coils, the first of said coils being wound upon given stator slots i and i+8, and the second coil of each pole group being wound upon the i+1 and i+9 stator slots; and
   (c) a plurality of second motor windings, each of said second windings also having a span length of eight stator slots, each winding of said second plurality also having two coils per pole group, the first of said coils being wound upon the i+2 and i+10 stator slots, and the second coil of each pole group being wound upon the i+3 and i+11 stator slots, said windings being symmetrically disposed about the opposite ends of each pole group, thereby leaving the central four slots of each group free of any windings, wherein a 0.67 pole pitch is thereby obtained.

2. A stator assembly for a dual, three-phase inverter driven motor, said stator assembly comprising:
   (a) a radially disposed matrix of phase belts each having several pole groups, said phase belts disposed at fixed radii about the axis of the rotor of the motor, each pole comprising a winding group of twelve stator slots;
   (b) a first plurality of three-phase motor windings, each of said windings having a span length of eight stator slots within its respective pole group, each pole group winding of said first plurality of motor windings having two coils per pole group, the first of said coils of each group being wound upon a given stator slot i and i+8, and the second coil of each pole group being wound upon the i+1 and i+9 stator slots; and
   (c) a second plurality of three phase motor windings, each of said windings having a span length of eight stator slots, each pole group winding of said second plurality of motor windings having two coils per pole group, the first coil of each pole group being wound upon the i+2 and i+10 stator slots, the second coil of each pole group being wound upon the i+3 and i+11 stator slots, wherein said first and second pluralities of motor windings are thereby symmetrically disposed at opposite ends of each phase-belt pole group, thereby leaving the central four slots of each phase-belt pole group free of any windings and thus obtaining a 0.67 pole pitch.

3. The stator assembly as recited in claim 2 in which the angular distance between each of said stator slots corresponds to 7.5 degrees of physical circumference of the stator assembly.

4. The stator assembly as recited in claim 2 in which said two slot winding separation between the pluralities of motor windings comprises a 30 degree respective winding offset between said first and second plurality of phase windings.

5. The stator assembly as recited in claim 2 in which said matrix of phase belts each comprises four pole groups.

6. The stator assembly as recited in claim 2 in which:
the first winding of phase belt A begins at $i=1$;
the first winding of phase belt B begins at $i=9$; and
the first winding of phase belt C begins at $i=17$.

7. The polyphase motor system as recited in claim 2 in which n equals 2.

8. The stator assembly as recited in claim 2 in which $i$ is a stator slot number between one and seventeen.

* * * * *